United States Patent
Park et al.

(10) Patent No.: US 10,805,285 B2
(45) Date of Patent: Oct. 13, 2020

(54) APPARATUS AND METHOD FOR AUTHENTICATION BASED ON COGNITIVE INFORMATION

(71) Applicant: ELECTRONICS AND TELECOMMUNICATIONS RESEARCH INSTITUTE, Daejeon (KR)

(72) Inventors: CheolYong Park, Daejeon (KR); HanJun Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 208 days.

(21) Appl. No.: 15/168,430

(22) Filed: May 31, 2016

(65) Prior Publication Data

US 2017/0289130 A1    Oct. 5, 2017

(30) Foreign Application Priority Data

Apr. 5, 2016    (KR) .................. 10-2016-0041453

(51) Int. Cl.
*H04L 29/06* (2006.01)
*G06N 5/02* (2006.01)
(Continued)

(52) U.S. Cl.
CPC .......... *H04L 63/083* (2013.01); *G06F 21/316* (2013.01); *G06N 5/022* (2013.01);
(Continued)

(58) Field of Classification Search
None
See application file for complete search history.

(56) References Cited

U.S. PATENT DOCUMENTS 8,036,350 B2 * 10/2011 Bettis .............. H04M 3/53333
379/88.17
8,745,698 B1 * 6/2014 Ashfield ............ G06Q 20/4014
726/4
(Continued)

FOREIGN PATENT DOCUMENTS

EP          1542430 A1 * 6/2005 ............ H04L 67/22
JP      2011-138488 A    7/2011
(Continued)

OTHER PUBLICATIONS

Valero et al., "Improving the Security and QoE in Mobile Devices through an Intelligent and Adaptive Continuous Authentication System", Nov. 2018, PMCID: PMC6263905 (Year: 2018).*

(Continued)

*Primary Examiner* — Piotr Poltorak
(74) *Attorney, Agent, or Firm* — LRK Patent Law Firm

(57) ABSTRACT

An authentication apparatus and method based on cognitive information. The authentication apparatus based on cognitive information includes an authentication request reception unit for receiving a request to authenticate an authentication target, a behavioral and contextual information collection unit for collecting behavioral and contextual information corresponding to the authentication target, a cognitive information extraction unit for extracting cognitive information corresponding to the request from previously stored big data, and an authentication processing unit for authenticating the authentication target in consideration of the behavioral and contextual information based on the extracted cognitive information.

12 Claims, 5 Drawing Sheets

(51) Int. Cl.
*G06F 21/31* (2013.01)
*H04W 12/06* (2009.01)
*H04W 12/00* (2009.01)

(52) U.S. Cl.
CPC .......... *H04L 63/08* (2013.01); *H04L 63/0861* (2013.01); *H04W 12/06* (2013.01); *H04L 2463/082* (2013.01); *H04W 12/00502* (2019.01); *H04W 12/00503* (2019.01); *H04W 12/00504* (2019.01); *H04W 12/00508* (2019.01)

(56) References Cited

U.S. PATENT DOCUMENTS

| | | | |
|---|---|---|---|
| 8,863,243 | B1 | 10/2014 | Lidzborski |
| 9,246,899 | B1* | 1/2016 | Durney ............... G06Q 20/4014 |
| 9,251,327 | B2* | 2/2016 | Donfried ............. G06F 21/316 |
| 9,619,852 | B2* | 4/2017 | Dutt ..................... G06Q 50/265 |
| 10,108,791 | B1* | 10/2018 | Masterman ............. G06F 21/32 |
| 10,200,364 | B1* | 2/2019 | Ketharaju ............ H04L 63/0861 |
| 10,325,259 | B1* | 6/2019 | Shahidzadeh ....... H04L 63/0807 |
| 10,523,708 | B1* | 12/2019 | Ilincic ................. H04M 3/5175 |
| 10,693,855 | B1* | 6/2020 | Kolman .................. H04L 63/20 |
| 10,740,758 | B2* | 8/2020 | Dutt ..................... G06Q 20/202 |
| 10,747,868 | B2* | 8/2020 | Bock ..................... H04L 9/3231 |
| 2004/0083394 | A1* | 4/2004 | Brebner .................. G06F 21/31 726/19 |
| 2004/0210756 | A1* | 10/2004 | Mowers .............. H04L 63/0869 713/168 |
| 2005/0105731 | A1* | 5/2005 | Basquin ............... G06Q 20/341 380/247 |
| 2006/0280339 | A1 | 12/2006 | Cho |
| 2007/0236330 | A1* | 10/2007 | Cho ........................ H04L 63/08 340/5.54 |
| 2009/0260075 | A1* | 10/2009 | Gedge .................. G06F 21/316 726/17 |
| 2010/0134250 | A1* | 6/2010 | Chung ............... G06K 9/00221 340/5.86 |
| 2010/0150049 | A1* | 6/2010 | Kim ..................... H04W 76/022 370/312 |
| 2010/0162376 | A1 | 6/2010 | Jeong et al. |
| 2011/0078004 | A1* | 3/2011 | Swanson, Sr. ...... G06Q 30/0211 705/14.13 |
| 2011/0148633 | A1 | 6/2011 | Kohlenberg et al. |
| 2011/0231310 | A1* | 9/2011 | Roberts .................. G06Q 20/32 705/40 |
| 2011/0252464 | A1* | 10/2011 | Sanjeev ................. H04L 63/107 726/7 |
| 2011/0314558 | A1* | 12/2011 | Song ..................... G06F 21/316 726/28 |
| 2012/0198489 | A1* | 8/2012 | O'Connell ............. G06Q 30/06 725/14 |
| 2013/0109351 | A1 | 5/2013 | Kato |
| 2013/0254875 | A1* | 9/2013 | Sama ...................... G06F 21/31 726/19 |
| 2014/0143149 | A1 | 5/2014 | Aissi |
| 2014/0316984 | A1* | 10/2014 | Schwartz ........... G06Q 20/4016 705/44 |
| 2014/0337243 | A1* | 11/2014 | Dutt ................ G06Q 20/40145 705/325 |
| 2015/0033305 | A1* | 1/2015 | Shear ...................... G06F 21/45 726/6 |
| 2015/0242601 | A1* | 8/2015 | Griffiths ................ G06F 21/305 726/5 |
| 2015/0242605 | A1* | 8/2015 | Du .......................... G06F 21/32 726/7 |
| 2015/0244699 | A1* | 8/2015 | Hessler ................... G06F 21/44 726/7 |
| 2015/0381598 | A1* | 12/2015 | Koved .................... H04L 63/08 726/3 |
| 2016/0006730 | A1* | 1/2016 | Chari .................. H04L 63/0861 726/7 |
| 2016/0021081 | A1* | 1/2016 | Caceres ................. H04L 63/08 726/7 |
| 2016/0065572 | A1* | 3/2016 | Kim .................... H04L 63/0861 726/7 |
| 2016/0134634 | A1* | 5/2016 | Rosendal ................ H04L 63/08 726/4 |
| 2016/0182503 | A1* | 6/2016 | Cheng ................. H04L 63/0861 726/7 |
| 2016/0219436 | A1* | 7/2016 | Bhasin .................. H04W 4/029 |
| 2017/0091450 | A1* | 3/2017 | Turgeman ............. G06F 21/32 |
| 2017/0230417 | A1* | 8/2017 | Amar ...................... H04L 63/20 |
| 2017/0230418 | A1* | 8/2017 | Amar ...................... H04L 67/22 |
| 2017/0289130 | A1* | 10/2017 | Park ...................... H04L 63/083 |
| 2017/0357980 | A1* | 12/2017 | Bakun .................... H04W 4/70 |
| 2018/0309752 | A1* | 10/2018 | Villavicencio ...... H04L 63/0861 |

FOREIGN PATENT DOCUMENTS

| | | | |
|---|---|---|---|
| JP | 2011-198170 A | | 10/2011 |
| JP | 2011198170 | * | 10/2011 |
| JP | 2015-515694 A | | 5/2015 |
| KR | 10-2007-0008744 A | | 1/2007 |
| KR | 10-2010-0063395 A | | 6/2010 |
| KR | 10-2010-0070521 A | | 6/2010 |

OTHER PUBLICATIONS

Keunok Kim et al., "International Standardization Trend of Authentication Technology of Multiple Elements Based on Mobile Devices," Journal of Korea Institute of Information Security & Cryptology, vol. 24, No. 4, Aug. 2014.

* cited by examiner

APPARATUS AND METHOD FOR AUTHENTICATION BASED ON COGNITIVE INFORMATION

CROSS REFERENCE TO RELATED APPLICATION

This application claims the benefit of Korean Patent Application No. 10-2016-0041453, filed Apr. 5, 2016, which is hereby incorporated by reference in its entirety into this application.

BACKGROUND OF THE INVENTION

1. Technical Field

The present invention relates generally to technology for authenticating an authentication target based on cognitive information and, more particularly, to a technique for authenticating an authentication target using behavioral and contextual information about the authentication target and cognitive information extracted from big data.

2. Description of the Related Art

Recently, as various devices for the Internet of Things (IoT) environment have been developed and users are increasingly using such devices, not only requirements for authenticating users and machines but also requirements for machine-to-machine authentication are increasing. Accordingly, various authentication methods, including single-factor authentication methods, such as an ID/password-based authentication method, a token-based authentication method, and a biometric authentication method, and multi-factor authentication methods are being used.

These authentication methods differ from each other in terms of user convenience and security. The ID/password authentication method performs authentication based on secret information that has been set in advance and shared between a user and a machine. Because the ID/password authentication method uses the preset password, it is advantageous in user convenience.

However, this method has limitations such as a problem related to the exposure of a password, inconvenience in which a password needs to be frequently changed in order to prevent the exposure thereof, a security vulnerability in storing and distributing information, and the like. Also, when setting a password between machines, a user must input the password.

Meanwhile, the token-based authentication method may use a hardware authentication token or a software authentication token. For example, a One-Time Password (OTP) device is a hardware authentication token, and an authentication certificate (X.509) is a software authentication token.

Because the hardware authentication token must be carried by a user in the form of physical hardware, it is disadvantageous from the aspects of portability and convenience. Also, when it is applied to a machine, the hardware authentication token needs to be mounted thereon, whereby hardware costs may increase.

The software authentication token is superior to the hardware authentication token from the aspects of portability and convenience. However, because the software authentication token is stored in a storage medium, it may be leaked. Also, when it is applied to a machine, a specialized program for operating the software authentication token is required.

The biometric authentication method authenticates a user based on unique biological characteristics or behavioral characteristics. The biometric authentication method does not require that an authentication token be carried, or that a preset password be shared. Also, when biological information about a user is used, it has high security.

However, it is not easy to construct a system for implementing the biometric authentication method. That is, the biometric authentication method is disadvantageous in that it is difficult to construct and manage a system in which authentication is performed by analyzing patterns of biological characteristics or behavioral characteristics. Also, because unique biological information is used, when such information is exposed, there may be an insurmountable problem. Furthermore, the biometric authentication method cannot be used to authenticate machines.

In order to overcome the problems of single-factor authentication, an authentication method in which two or more single-factor authentication methods are combined is used. For example, an authentication method in which ID/password authentication is combined with a mobile phone authentication code and an authentication method that uses both a security token and an OTP card are mainly used.

However, a method that requires the input of authentication factors or a method in which a token or system for authentication is added to a machine may lower user convenience and security. Also, because multi-factor authentication using existing single-factor authentication methods requires that multiple elements be carried and that two-channel communication be conducted, authentication factors and resources for communication may not be effectively used.

Therefore, it is necessary to develop technology for performing authentication between users, between objects, and between a user and an object more simply and effectively than when using existing methods.

DOCUMENTS OF RELATED ART (Patent Document 1) Korean Patent Application Publication No. 10-2007-0008744, disclosed on Jan. 18, 2007 and titled "Apparatus and method for generating a pattern for behavior-based user authentication".

SUMMARY OF THE INVENTION

An object of the present invention is to provide an authentication service more conveniently and effectively than existing authentication methods.

Another object of the present invention is to provide mutual authentication service between users, between an object and a user, and between objects using big data.

A further object of the present invention is to enable secure authentication by using behavioral and contextual information as authentication information.

Yet another object of the present invention is to overcome problems with conventional authentication methods, resulting from loss, exposure, and damage of authentication information, and thereby to enable temporary authentication and to prevent unauthorized entities from being authenticated.

Still another object of the present invention is to provide a more effective and secure authentication service in combination with an existing authentication method.

In order to accomplish the above object, an authentication apparatus based on cognitive information according to the present invention includes an authentication request reception unit for receiving a request to authenticate an authentication target, a behavioral and contextual information collection unit for collecting behavioral and contextual information corresponding to the authentication target, a cognitive information extraction unit for extracting cognitive information corresponding to the request from previously stored big data, and an authentication processing unit for authenticating the authentication target in consideration of the behavioral and contextual information based on extracted cognitive information.

The authentication processing unit may authenticate the authentication target by determining at least one of continuity, authenticity, validity, and correctness of the behavioral and contextual information.

The authentication processing unit may determine the continuity of the behavioral and contextual information in consideration of at least one of whether the behavioral and contextual information is continuously received for a time longer than a threshold time and whether a number of times that the behavioral and contextual information is received is equal to or greater than a threshold number of times.

The authentication processing unit may determine the authenticity of the behavioral and contextual information in consideration of whether the behavioral and contextual information is authentic information such that a change in the behavioral and contextual information is equal to or less than a threshold variation.

The authentication processing unit may determine the validity of the behavioral and contextual information by comparing a result of a change in the behavioral and contextual information with a result of a prediction corresponding to the behavioral and contextual information.

The authentication processing unit may determine the correctness by checking whether a change in a pattern of the behavioral and contextual information is correct based on the extracted cognitive information.

The previously stored big data may be collected using at least one of a location sensor, a beacon signal collection sensor, a bio-signal collection sensor, and an environment sensor, or the previously stored big data may be at least one of a kind of a network, a kind of an access network, and information about execution of an application, corresponding to the authentication target.

The authentication target may be at least one of a user to be authenticated and a device to be authenticated.

The authentication apparatus may further include an authentication result output unit for outputting a result of authentication of the authentication target.

The authentication processing unit may perform multi-factor authentication in combination with at least one of an ID/password-based authentication method, an authentication token-based authentication method, and a biometric authentication method.

Also, an authentication method based on cognitive information, performed by an authentication apparatus based on cognitive information, according to an embodiment of the present invention includes receiving a request to authenticate an authentication target, collecting behavioral and contextual information corresponding to the authentication target, extracting cognitive information corresponding to the request from previously stored big data, and authenticating the authentication target in consideration of the behavioral and contextual information based on the extracted cognitive information.

Authenticating the authentication target may be configured to authenticate the authentication target by determining at least one of continuity, authenticity, validity, and correctness of the behavioral and contextual information.

Authenticating the authentication target may be configured to determine the continuity of the behavioral and contextual information in consideration of at least one of whether the behavioral and contextual information is continuously received for a time longer than a threshold time and whether a number of times that the behavioral and contextual information is received is equal to or greater than a threshold number of times.

Authenticating the authentication target may be configured to determine the authenticity of the behavioral and contextual information in consideration of whether the behavioral and contextual information is authentic information such that a change in the behavioral and contextual information is equal to or less than a threshold variation.

Authenticating the authentication target may be configured to determine the validity of the behavioral and contextual information by comparing a result of change in the behavioral and contextual information with a result of prediction corresponding to the behavioral and contextual information.

Authenticating the authentication target may be configured to determine the correctness by checking whether a change in a pattern of the behavioral and contextual information is correct based on the extracted cognitive information.

The previously stored big data may be collected using at least one of a location sensor, a beacon signal collection sensor, a bio-signal collection sensor, and an environment sensor, or the previously stored big data may be at least one of a kind of a network, a kind of an access network, and information about execution of an application, corresponding to the authentication target.

The authentication target may be at least one of a user to be authenticated and a device to be authenticated.

The authentication method may further include outputting a result of authentication of the authentication target.

Authenticating the authentication target may be configured to authenticate the authentication target in combination with at least one of an ID/password-based authentication method, an authentication token-based authentication method, and a biometric authentication method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
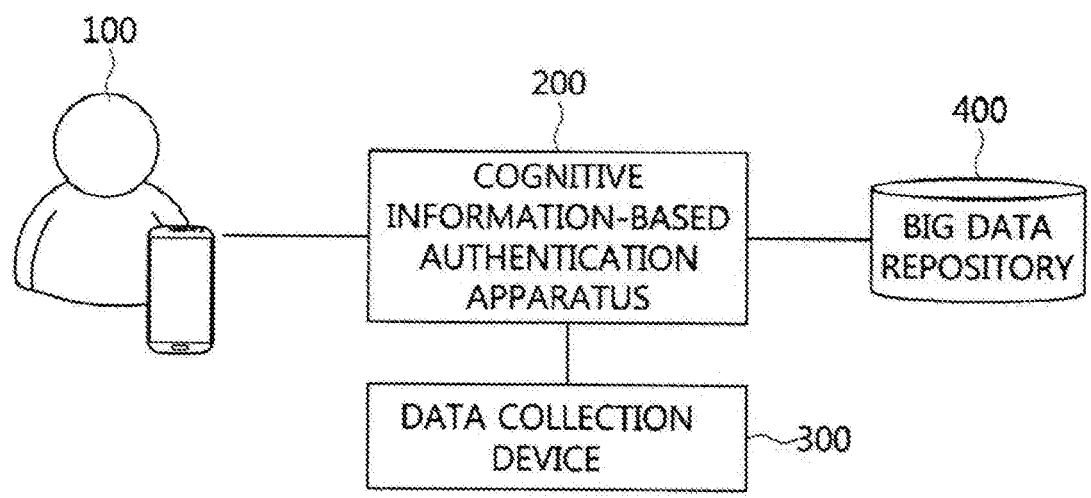
FIG. 1 is a view schematically illustrating an environment in which a cognitive information-based authentication apparatus is applied according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a view schematically illustrating an environment in which a cognitive information-based authentication apparatus is applied according to an embodiment of the present invention.

As illustrated in FIG. 1, a cognitive information-based authentication apparatus 200, which receives a request to authenticate an authentication target 100, collects behavioral and contextual information about the authentication target 100 from a data collection device 300.

Then, the cognitive information-based authentication apparatus 200 extracts cognitive information corresponding to the authentication target 100 from a big data repository 400. The cognitive information-based authentication apparatus 200 authenticates the authentication target 100 using the collected behavioral and contextual information about the authentication target 100 and the extracted cognitive information.

The authentication target 100 may be a person or an object, and as the authentication target 100 behaves or operates, behavioral and contextual information corresponding to the authentication target 100 may be generated.

Here, the behavioral and contextual information about the authentication target 100 may include at least one of information about the location of the authentication target 100, information about the movement of the authentication target 100, information about a nearby beacon, information about a device connected thereto, information about a target to communicate therewith, information about a communication interface, weather information, environmental information, and information about circumstances.

The cognitive information-based authentication apparatus 200 receives a request to authenticate the authentication target 100. Here, the cognitive information-based authentication apparatus 200 may receive the authentication request directly from the authentication target 100.

Also, when receiving behavioral and contextual information about the authentication target 100, the cognitive information-based authentication apparatus 200 regards it as the reception of a request to authenticate the authentication target 100, and may then perform authentication.

The cognitive information-based authentication apparatus 200 collects behavioral and contextual information about the authentication target 100 and extracts cognitive information corresponding to an authentication request from previously stored big data. Then, the cognitive information-based authentication apparatus 200 authenticates the authentication target 100 using the behavioral and contextual information and the extracted cognitive information.

Here, the cognitive information-based authentication apparatus 200 may authenticate the authentication target 100 by determining at least one of the continuity, authenticity, validity, and correctness of the behavioral and contextual information.

The data collection device 300 collects behavioral and contextual information about the authentication target 100 and delivers the collected information to the cognitive information-based authentication apparatus 200. Here, the behavioral and contextual information collected by the data collection device 300 may be used to authenticate the authentication target 100, or may be stored as big data.

The big data repository 400 stores cognitive information, which is a criterion for authenticating the authentication target 100. Here, the cognitive information means big data generated in association with the behavior and context of a person or object, and the big data repository 400 may collect and store big data by itself through a big data generation unit, or may store big data received from the outside.

Also, the big data repository 400 continuously updates the big data, and may transmit big data corresponding to the authentication target 100 to the cognitive information-based authentication apparatus 200 upon receiving a request for cognitive information from the cognitive information-based authentication apparatus 200.

For the convenience of description, the cognitive information-based authentication apparatus 200 is described as receiving behavioral and contextual information and big data from the external data collection device 300 and the big data repository 400, respectively. However, without limitation to this, the cognitive information-based authentication apparatus 200 may collect behavioral and contextual information by itself, or may generate and store big data by itself.

Hereinafter, the configuration of a cognitive information-based authentication apparatus according to an embodiment of the present invention will be described in detail with reference to FIG. 2.

Figure 2:
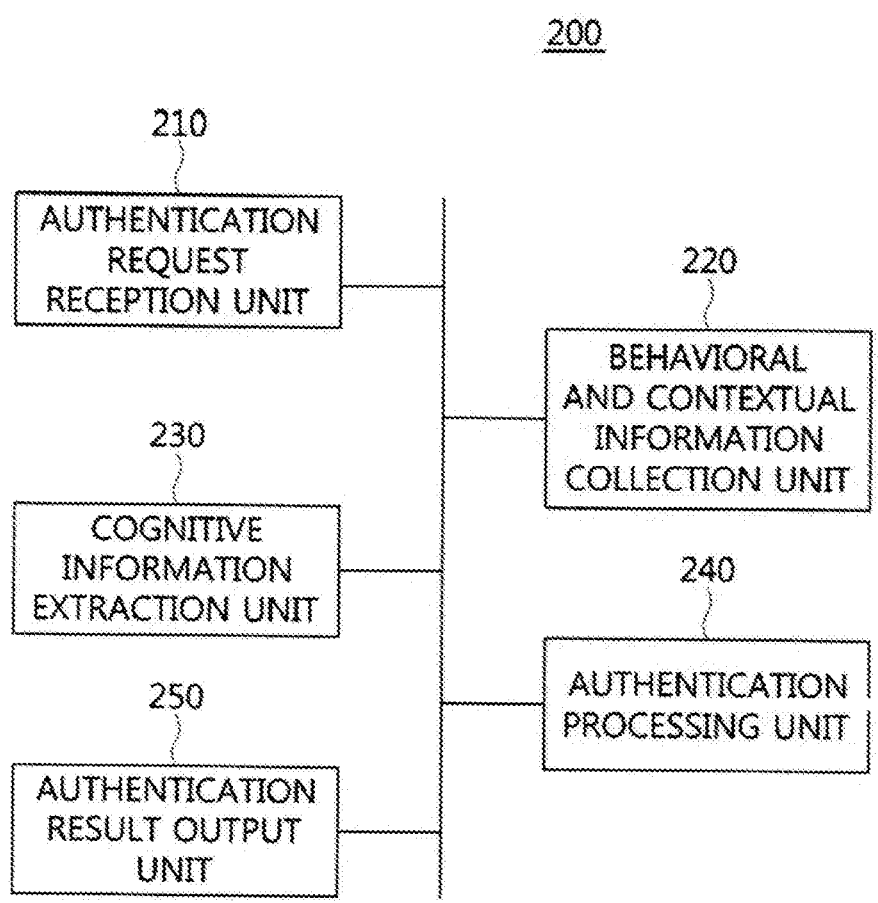
FIG. 2 is a block diagram illustrating the configuration of a cognitive information-based authentication apparatus according to an embodiment of the present invention.

FIG. 2 is a block diagram illustrating the configuration of a cognitive information-based authentication apparatus according to an embodiment of the present invention.

As illustrated in FIG. 2, the cognitive information-based authentication apparatus 200 includes an authentication request reception unit 210, a behavioral and contextual information collection unit 220, a cognitive information extraction unit 230, an authentication processing unit 240, and an authentication result output unit 250.

First, the authentication request reception unit 210 receives a request to authenticate an authentication target.

Here, the authentication target may be a user or an object (machine) to be authenticated.

The authentication request reception unit 210 may receive the authentication request directly from the authentication target, or from an additional device or software, which requires that the authentication target be authenticated.

For the convenience of description, the authentication request reception unit 210 is described as receiving the authentication request. However, without limitation to this, when behavioral and contextual information is collected, even if it does not receive an authentication request, the cognitive information-based authentication apparatus 200 may determine that it has received an authentication request. Particularly, when behavioral and contextual information corresponding to a predetermined condition is collected, the cognitive information-based authentication apparatus 200 may determine that it has received an authentication request.

The behavioral and contextual information collection unit 220 collects behavioral and contextual information about the authentication target.

The behavioral and contextual information collection unit 220 may collect behavioral and contextual information about the authentication target by itself using a collection module included therein. Also, the behavioral and contextual information collection unit 220 may receive behavioral and contextual information about the authentication target from an external data collection device 300.

Here, the behavioral and contextual information may include at least one of the location information, movement information, beacon signal information, bio-signal information, environmental information, and information about a running application, which correspond to the authentication target.

The cognitive information extraction unit 230 extracts cognitive information corresponding to the authentication request from previously stored big data.

Here, the previously stored big data may be collected using at least one of a location sensor, a beacon signal collection sensor, a biometrics collection sensor, and an environment sensor. Also, the previously stored big data may include at least one of a kind of network, a kind of access network, and information about execution of an application, corresponding to the authentication target.

Also, the cognitive information extraction unit 230 may extract cognitive information from big data stored in the cognitive information-based authentication apparatus 200, or may extract cognitive information from the external big data repository 400.

The authentication processing unit 240 authenticates the authentication target based on the extracted cognitive information in consideration of the behavioral and contextual information.

The authentication processing unit 240 may authenticate the authentication target by determining at least one of the continuity, authenticity, validity and correctness of the behavioral and contextual information.

Here, the authentication processing unit 240 may determine the continuity of the behavioral and contextual information based on at least one of whether the behavioral and contextual information is continuously received for a time period longer than a threshold time and whether the number of times that the behavioral and contextual information is received is equal to or greater than a threshold number of times.

By determining the continuity of the behavioral and contextual information, the authentication processing unit 240 may determine whether to perform authentication of the authentication target corresponding to the behavioral and contextual information, or may perform authentication of the authentication target.

For example, it is assumed that the behavioral and contextual information about the movement of a vehicle is collected. Here, because a network changes with the movement of the vehicle, the behavioral and contextual information is continuously generated. Therefore, the authentication processing unit 240 determines whether the behavioral and contextual information corresponding to the movement of the vehicle is continuously collected, and if so, it may authenticate the corresponding authentication target.

Conversely, if the authentication processing unit 240 receives the behavioral and contextual information about the movement of the vehicle only once, the authentication processing unit 240 may not perform authentication of the authentication target corresponding to the behavioral and contextual information.

Also, the authentication processing unit 240 may determine the authenticity of the behavioral and contextual information based on whether a change in behavioral and contextual information is equal to or less than a threshold variation.

For example, it is assumed that behavioral and contextual information corresponding to tapping a transportation card when boarding a bus is received, and that behavioral and contextual information indicating that the moving speed is 60 km/h is received. Then, when behavioral and contextual information indicating that the moving speed is 200 km/h is received, the authentication processing unit 240 determines that the change in the behavioral and contextual information exceeds a threshold variation and thus the corresponding behavioral and contextual information is not authentic information.

Here, the threshold variation may be set based on the behavioral and contextual information, and may be set using previously stored big data. Also, if the change in the behavioral and contextual information is equal to or less than the threshold variation, the authentication processing unit 240 may authenticate the authentication target corresponding to the behavioral and contextual information.

Also, the authentication processing unit 240 may determine the validity of the behavioral and contextual information by comparing predicted behavioral and contextual information with the result of the change in behavioral and contextual information.

For example, assume that behavioral and contextual information indicating that a car is moving is received, that behavioral and contextual information indicating that the car passes the entrance to a parking lot is received, and that behavioral and contextual information indicating that the car is parked is received. Then, if behavioral and contextual information indicating that the parking charge for the corresponding parking lot has been paid using a credit card is received, the authentication processing unit 240 determines that this behavioral and contextual information is reasonable.

The behavior of paying the parking charge after passing through the entrance to the parking lot is predictable. Specifically, when the authentication processing unit 240 receives the behavioral and contextual information that indicates entry into the parking lot, it may predict behaviors such as parking the car, paying the parking charge using a credit card, getting a receipt for the parking charge, and the like. Here, the authentication processing unit 240 may predict such behaviors based on the extracted cognitive information.

Then, the authentication processing unit 240 compares the prediction with the behavioral and contextual information generated after the prediction, and thereby determines whether the behavioral and contextual information generated after the prediction is valid.

If it receives behavioral and contextual information that indicates getting a receipt at a gas station after passing through the entrance to a parking lot, the authentication processing unit 240 determines that the corresponding behavioral and contextual information is not valid, and may not perform authentication of the authentication target corresponding to the behavioral and contextual information.

Also, the authentication processing unit 240 may determine the correctness of a change in the pattern of behavioral and contextual information based on the extracted cognitive information.

The authentication processing unit 240 may authenticate the authentication target by determining whether the change in the pattern of the behavioral and contextual information is correct. For example, assume that behavioral and contextual information indicating that an authentication target boards a bus, the route number of which is 101, and taps a transportation card on a card reader. Then, behavioral and contextual information that includes a beacon signal corresponding to bus stop A is received.

Here, the authentication processing unit 240 checks whether the service route of the number 101 bus includes the bus stop A. The authentication processing unit 240 extracts cognitive information corresponding to the service route of the number 101 bus from the big data repository, and determines whether it is correct that the authentication target has received the beacon signal corresponding to the bus stop A by examining the extracted cognitive information and the bus stop A.

If the bus stop A is not located along the service route of the number 101 bus and if the current location of the number 101 bus, carrying the authentication target, differs from the bus stop A, the authentication processing unit 240 may not perform the authentication of the authentication target. Conversely, if the service route of the number 101 bus includes the bus stop A, the authentication processing unit 240 may authenticate the authentication target.

Finally, the authentication result output unit 250 outputs the result of authentication corresponding to the authentication target. The authentication result output unit 250 may output the authentication result to the cognitive information-based authentication apparatus 200, or may transmit the authentication result to the external device or software that sent the authentication request.

Hereinafter, a cognitive information-based authentication method performed by a cognitive information-based authentication apparatus according to an embodiment of the present invention will be described in more detail with reference to FIG. 3.

Figure 3:
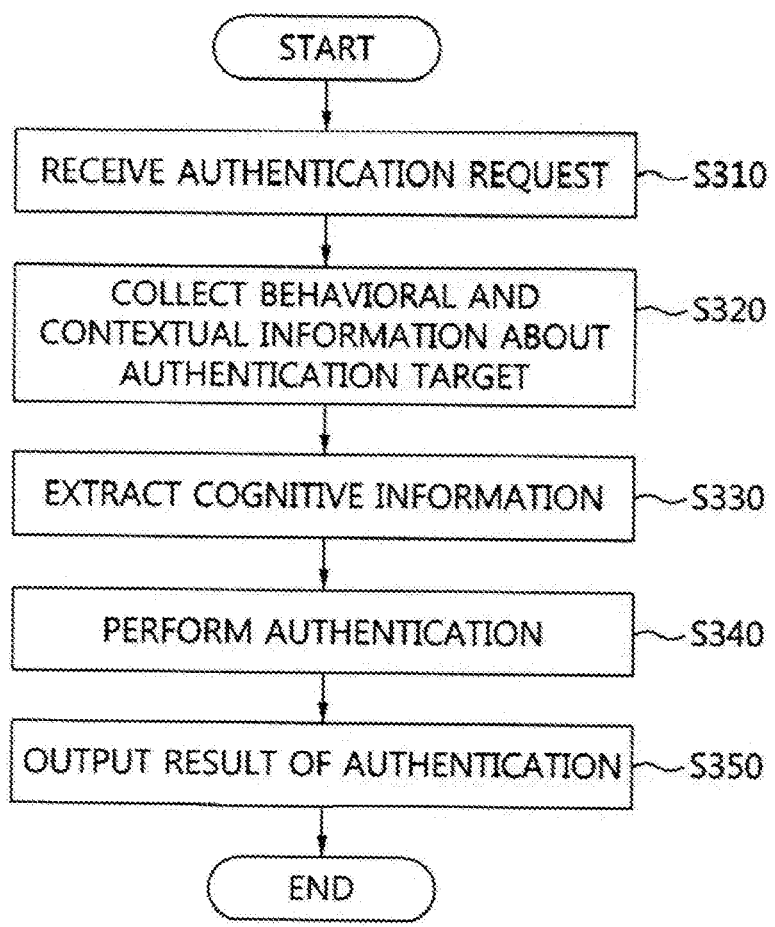
FIG. 3 is a flowchart illustrating a cognitive information-based authentication method according to an embodiment of the present invention.

FIG. 3 is a flowchart illustrating a cognitive information-based authentication method according to an embodiment of the present invention.

First, a cognitive information-based authentication apparatus 200 receives a request to authenticate an authentication target at step S310.

Here, the cognitive information-based authentication apparatus 200 may receive the authentication request from the authentication target, or may receive the authentication request from an external device or software.

Then, the cognitive information-based authentication apparatus 200 collects behavioral and contextual information about the authentication target at step S320.

The cognitive information-based authentication apparatus 200 collects the behavioral and contextual information about the authentication target by itself using a collection module therein, or may receive the behavioral and contextual information from an external data collection device.

Also, if the authentication target includes a sensor or a collection module, the authentication target may generate behavioral and contextual information about the behavior, surrounding environment, and context of the authentication target using the sensor or the collection module. Accordingly, the cognitive information-based authentication apparatus 200 may collect the behavioral and contextual information from the authentication target.

Here, the behavioral and contextual information may include at least one of location information, movement information, beacon signal information, bio-signal information, environmental information, and information about a running application, which correspond to the authentication target.

For example, assume that the cognitive information-based authentication apparatus 200 collects behavioral and contextual information indicating that an authentication target gets into a car and starts the car. Here, the cognitive information-based authentication apparatus 200 may collect behavioral and contextual information such as the location of the car, the speed of the car, whether a navigation app is running on the terminal of the authentication target, the route indicated by the navigation app, information about traffic monitoring cameras, information about usage of a function capable of deferring payment in order to quickly pass a toll gate in an expressway (hi-pass function in Korea), traffic information collected by a traffic information collector, the temperature inside and outside the car, and the like.

Also, when it is determined that the authentication target is traveling by bus, the cognitive information-based authentication apparatus 200 may collect behavioral and contextual information such as information about the bus service route, the travel time, information about the credit card used to buy a bus ticket, the time at which the charge was paid, information about the location of the bus, and the like.

Also, the behavioral and contextual information may be collected using the communication network of a smart device owned by the authentication target, a traffic network, an open Wi-Fi network, a special network for collecting big data, and a network connected to beacons.

Also, the behavioral and contextual information collected at step S320 may be stored as big data in a big data cloud server or big data repository.

Next, the cognitive information-based authentication apparatus 200 extracts cognitive information at step S330.

The cognitive information-based authentication apparatus 200 extracts cognitive information corresponding to the behavioral and contextual information collected at step S320. Here, the cognitive information-based authentication apparatus 200 may extract the cognitive information corresponding to the behavioral and contextual information from the big data stored in the storage module therein. Also, the cognitive information-based authentication apparatus 200 may extract the cognitive information from the big data stored in an external big data repository.

If behavioral and contextual information indicating that a transportation card has been tapped on the card reader of a bus, the number of which is 101, was collected at step S320, the cognitive information-based authentication apparatus 200 may extract the service route of the number 101 bus, the speed of the bus, the current location of the bus, and the like, as the cognitive information.

Then, the cognitive information-based authentication apparatus 200 performs authentication at step S340.

The cognitive information-based authentication apparatus 200 authenticates the authentication target based on the extracted cognitive information in consideration of the behavioral and contextual information. Here, the cognitive information-based authentication apparatus 200 may authenticate the authentication target by determining at least one of the continuity, authenticity, validity, and correctness of the behavioral and contextual information.

The cognitive information-based authentication apparatus 200 may determine the continuity of the behavioral and contextual information based on at least one of whether the behavioral and contextual information is continuously received for a time longer than a threshold time and whether the number of times that the behavioral and contextual information is received is equal to or greater than a threshold number of times. If the behavioral and contextual information is determined to be continuous, authentication of the authentication target may be performed.

The cognitive information-based authentication apparatus 200 may determine the authenticity of the behavioral and contextual information based on whether a change of the behavioral and contextual information is equal to or less than a threshold variation. If the behavioral and contextual information is determined to be authentic information, the cognitive information-based authentication apparatus 200 may perform authentication of the authentication target.

Also, the cognitive information-based authentication apparatus 200 may determine the validity of the behavioral and contextual information by comparing predicted behavioral and contextual information with the result of the change in behavioral and contextual information. If the behavioral and contextual information is determined to be reasonable, the cognitive information-based authentication apparatus 200 may perform authentication of the authentication target.

Also, the cognitive information-based authentication apparatus 200 may determine the correctness of a change in the pattern of behavioral and contextual information based on the extracted cognitive information. If it is determined that the change in the pattern of behavioral and contextual information is correct, the cognitive information-based authentication apparatus 200 may perform authentication of the authentication target.

Finally, the cognitive information-based authentication apparatus 200 outputs the authentication result at step S350.

The cognitive information-based authentication apparatus 200 may output the authentication result to the cognitive information-based authentication apparatus 200, or may transmit the authentication result to the external device or software that sent the authentication request.

If the cognitive information-based authentication apparatus 200 is an authentication server for Single Sign-On (SSO), the cognitive information-based authentication apparatus 200 may transmit the result of authentication of the authentication target to the authentication request device that requested the authentication.

Also, the cognitive information-based authentication apparatus 200 may be combined with an existing authentication method such as an ID/password-based authentication method. In this case, if authentication information is lost, the cognitive information-based authentication apparatus 200 may authenticate the person who requested authentication using behavioral and contextual information about the person.

Also, when authentication information is exposed, if an unauthorized user or object requests authentication, the cognitive information-based authentication apparatus 200 may block the request of the unauthorized entity by comparing the behavioral and contextual information about an authorized user or object with that about the unauthorized entity. Accordingly, the cognitive information-based authentication apparatus 200 may overcome the difficulty whereby a device for inputting an ID/password must be installed in the object and the inconvenience whereby a user must input a password when authentication is requested.

Also, the cognitive information-based authentication apparatus 200 may be combined with an authentication token-based method. In this case, if a hardware authentication token is lost or is not carried, the cognitive information-based authentication apparatus 200 may perform temporary authentication by checking the behavioral and contextual information about the person who requested authentication.

Also, when information about a software authentication token is lost or exposed, the cognitive information-based authentication apparatus 200 performs authentication using behavioral and contextual information, whereby temporary authentication may be performed for a normal authorized user and authentication requests by unauthorized users may be prevented.

Here, the cognitive information-based authentication apparatus 200 may overcome problems that may occur when an existing token-based authentication system is used, for example, problems related to the cost of constructing a specialized authentication system, the cost of managing the system, the need to issue a great number of authentication tokens with an increase in users, and the like.

Also, the cognitive information-based authentication apparatus 200 may perform authentication in combination with a biometric authentication method. Here, if the integrity of the biometric information about a user, which has been registered in a biometric authentication system, is damaged, the cognitive information-based authentication apparatus 200 may temporarily authenticate the normal user by performing authentication using behavioral and contextual information about the authentication target before the normal user newly registers his or her biometric information.

Also, the cognitive information-based authentication apparatus 200 may be combined with an existing authentication method, such as a two-channel service of Internet banking services in order to provide multi-factor authentication, thus providing convenience to a user who requests authentication.

Hereinafter, a cognitive information generation method performed by a cognitive information-based authentication apparatus according to an embodiment of the present invention will be described in detail with reference to FIG. 4.

Figure 4:
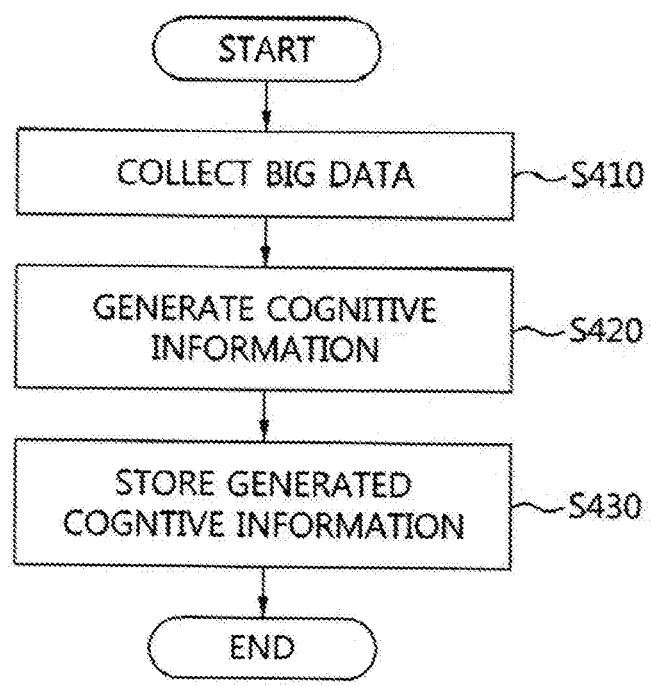
FIG. 4 is a flowchart illustrating a method for generating cognitive information according to an embodiment of the present invention.

FIG. 4 is a flowchart illustrating a method for generating cognitive information according to an embodiment of the present invention.

First, a cognitive information-based authentication apparatus 200 collects big data at step S410.

The cognitive information-based authentication apparatus 200 may collect big data such as the location of a user or an object, information collected using signals from nearby beacons, information about access networks, the type of a device used to collect information, the movement speed, displacement, information about communication with nearby devices, environmental factors such as temperature and humidity in the area, variation in environmental factors, information about the circumstances, and the like. The big data may be individually identifiable information or may be information about circumstances linked to the individually identifiable information.

Here, the cognitive information-based authentication apparatus 200 may collect big data using collection modules, which may measure and collect information about the surrounding environment or circumstances, such as various environment sensors, a location sensor, a photo-sensor, a recognition sensor, and the like. Also, the cognitive information-based authentication apparatus 200 may collect big data from users and objects through communication networks.

Then, the cognitive information-based authentication apparatus 200 generates cognitive information at step S420.

The cognitive information-based authentication apparatus 200 generates cognitive information by processing the collected big data. Here, if the big data are collected from multiple devices, the cognitive information-based authentication apparatus 200 assigns an identification code to each of the devices, and may generate big data to which the identification code is assigned.

When the cognitive information-based authentication apparatus 200 collects big data from users and objects, the cognitive information-based authentication apparatus 200 may map the generated cognitive information to information about the users and objects.

Subsequently, the cognitive information-based authentication apparatus 200 stores the generated cognitive information at step S430.

The cognitive information-based authentication apparatus 200 stores the cognitive information in the form of a digitized database.

Here, the cognitive information-based authentication apparatus 200 may check whether the cognitive information is collected normally, and may then store the cognitive information by performing step S430, which will be described later, only when the cognitive information is determined to have been collected normally.

The cognitive information-based authentication apparatus 200 may store the big data so as to be mapped to the authentication target. Also, the cognitive information-based authentication apparatus 200 checks the continuity and correlation between cognitive information, which was previously collected and stored, and the generated cognitive information, and may store the generated cognitive information only when it is determined that there is validity between the generated cognitive information and the stored cognitive information.

Here, the cognitive information-based authentication apparatus 200 may check the validity between the generated cognitive information and the stored cognitive information through various validation methods, for example, by checking the validity of displacement between the stored cognitive information and the generated cognitive information, the consistency of identification information about objects around an authentication target corresponding to the cognitive information, the consistency of information about the surroundings, the consistency of the behavior of the authentication target and the context of the connected device, information about the comparison of temperature in stored cognitive information with the mean of the variation of temperature in the current location, and the like.

Figure 5:
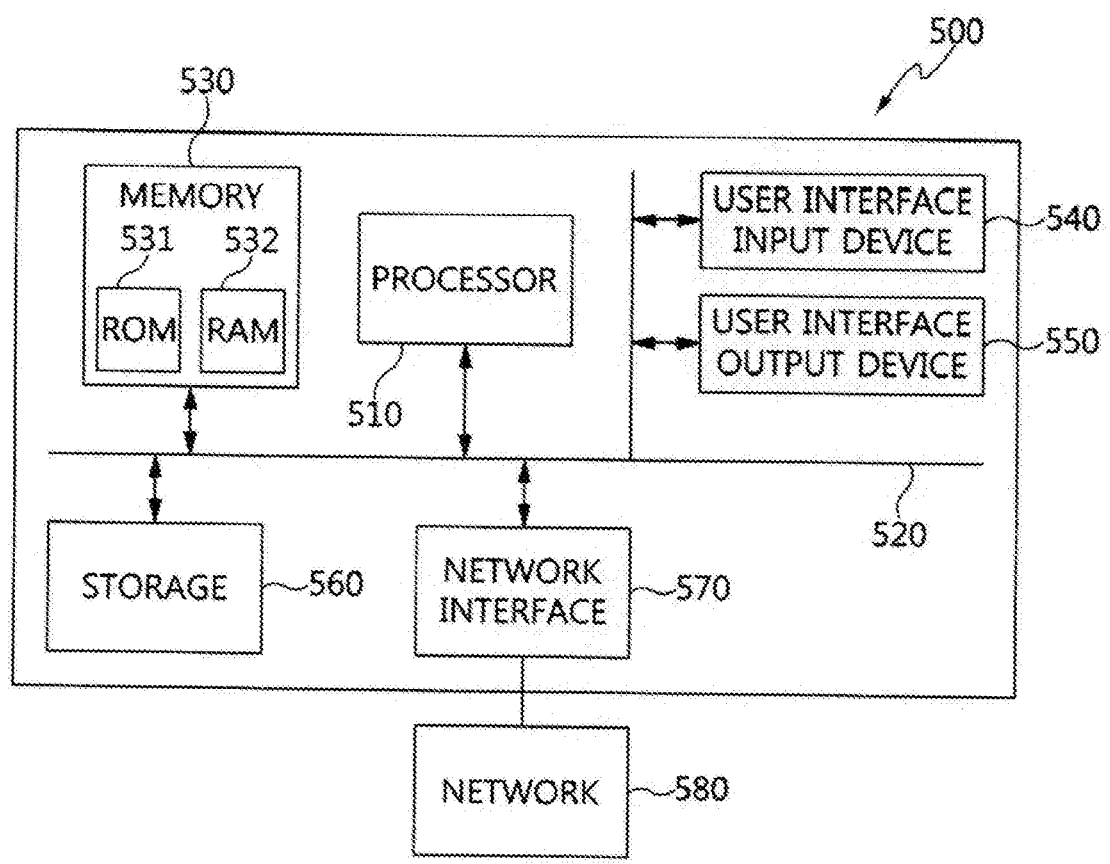
FIG. 5 is a block diagram illustrating a computer system according to an embodiment of the present invention.

FIG. 5 is a block diagram illustrating a computer system according to an embodiment of the present invention.

Referring to FIG. 5, an embodiment of the present invention may be implemented in a computer system 500 such as a computer-readable recording medium. As illustrated in FIG. 5, the computer system 500 may include one or more processors 510, memory 530, a user interface input device 540, a user interface output device 550, and storage 560, which communicate with each other via a bus 520. Also, the computer system 500 may further include a network interface 570 connected to a network 580. The processor 510 may be a central processing unit or a semiconductor device for executing processing instructions stored in the memory 530 or storage 560. The memory 530 and the storage 560 may be various types of volatile or nonvolatile storage media. For example, the memory may include ROM 531 or RAM 532.

Therefore, the embodiment of the present invention may be implemented as a method implemented by a computer or a non-volatile computer-readable medium in which instructions executable by a computer are recorded. When computer-readable instructions are executed by a processor, the computer-readable instructions may perform the method according to at least one aspect of the present invention.

According to the present invention, an authentication service may be provided more conveniently and effectively than a conventional authentication method.

Also, according to the present invention, using big data, mutual authentication service between users, between a user and an object, and between objects may be provided.

Also, according to the present invention, secure authentication may be provided by using behavioral and contextual information as authentication information.

Also, according to the present invention, problems attributable to loss, exposure, and damage of authentication information in an existing authentication method may be overcome, whereby temporary authentication may be provided and authentication of unauthorized entities may be prevented.

Also, according to the present invention, in combination with an existing authentication method, more effective and secure authentication service may be provided.

As described above, the apparatus and method for authentication based on cognitive information according to the present invention are not limitedly applied to the configurations and operations of the above-described embodiments, but all or some of the embodiments may be selectively combined and configured so that the embodiments may be modified in various ways.

What is claimed is:

1. An authentication apparatus based on cognitive information, comprising:
   a server device comprising one or more units which are executed by a processor, the one or more units comprising:
   an authentication request reception unit for receiving a request to perform a primary authentication for an authentication target;
   a behavioral and contextual information collection unit for collecting behavioral and contextual information corresponding to the authentication target;
   a cognitive information extraction unit for extracting cognitive information corresponding to the request from previously stored big data; and
   an authentication processing unit for performing a secondary authentication for the authentication target in consideration of the behavioral and contextual information based on extracted cognitive information, wherein the authentication processing unit blocks the request of performing the primary authentication or cancels an already performed primary authentication when the secondary, authentication fails,
   wherein the primary authentication is performed using authentication information other than the cognitive information,
   wherein the authentication information is at least one of an ID/password-based authentication method, an authentication token-based authentication method, and a biometric authentication method, and
   wherein the authentication processing, unit is configured to execute the following:
   predicting possible transactions by the authentication target based on recent location information and the type of transactions that should occur near a location identified by the recent location information, wherein the authentication processing unit, provides the secondary authentication when the transaction that occurs is one of the predicted transactions and not providing the secondary authentication when the transaction that occurs is not one of the predicted transactions.

2. The authentication apparatus of claim 1, wherein the authentication processing unit determines the continuity of the behavioral and contextual information by determining whether a number of times that the behavioral and contextual information is received is equal to or greater than a threshold number of times.

3. The authentication apparatus of claim 1, wherein the authentication processing unit determines the authenticity of the behavioral and contextual information in consideration of whether the behavioral and contextual information is authentic information such that a change in the behavioral and contextual information is equal to or less than a threshold variation.

4. The authentication apparatus of claim 1, wherein the previously stored big data are collected using at least one of a location sensor, a beacon signal collection sensor, a bio-signal collection sensor, and an environment sensor, or the previously stored big data are at least one of a kind of a network, a kind of an access network, and information about execution of an application, corresponding to the authentication target.

5. The authentication apparatus of claim 1, wherein the authentication target is at least one of a user to be authenticated and a device to be authenticated.

6. The authentication apparatus of claim 1, further comprising,
an authentication result output unit for outputting a result of authentication of the authentication target.

7. An authentication method based on cognitive information, performed by an authentication apparatus based on cognitive information, the method comprising:
receiving a request to perform a primary authentication for an authentication target;
collecting behavioral and contextual information corresponding to the authentication target;
extracting cognitive information corresponding to the request from previously stored big data; and
performing a secondary authentication for the authentication target in consideration of the behavioral and contextual information based on the extracted cognitive information, wherein the authentication apparatus blocks the request of performing the primary authentication or cancels an already performed primary authentication when the secondary authentication fails,
wherein the primary authentication is performed using authentication information other than the cognitive information,
wherein the authentication information is at least one of an ID/password-based authentication method, an authentication token-based authentication method, and a biometric authentication method,
wherein the secondary authentication comprises:
predicting possible transactions by the authentication target based on recent location information and the type of transactions that should occur near a location identified by the recent location information, and providing the secondary authentication when the transaction that occurs is one of the predicted transactions and not providing the secondary authentication when the transaction that occurs is not one of the predicted transactions, and
wherein the above authentication steps are implemented by at least one device.

8. The method of claim 7, wherein authenticating the authentication target includes determining the continuity of the behavioral and contextual information by determining whether a number of times that the behavioral and contextual information is received is equal to or greater than a threshold number of times.

9. The method of claim 7, wherein authenticating the authentication target includes determining the authenticity of the behavioral and contextual information in consideration of whether the behavioral and contextual information is authentic information such that a change in the behavioral and contextual information is equal to or less than a threshold variation.

10. The method of claim 7, wherein the previously stored big data are collected using at least one of a location sensor, a beacon signal collection sensor, a bio-signal collection sensor, and an environment sensor, or the previously stored big data are at least one of a kind of a network, a kind of an access network, and information about execution of an application, corresponding to the authentication target.

11. The method of claim 7, wherein the authentication target is at least one of a user to be authenticated and a device to be authenticated.

12. The method of claim 7, further comprising,
outputting a result of authentication of the authentication target.

* * * * *